United States Patent
Kim et al.

(10) Patent No.: US 10,877,520 B2
(45) Date of Patent: Dec. 29, 2020

(54) ELECTRONIC DEVICE WITH FULL-DISPLAY

(71) Applicant: Samsung Electronics Co., Ltd., Gyeonggi-do (KR)

(72) Inventors: Dong Hun Kim, Gyeonggi-do (KR); Jung Sik Park, Gyeonggi-do (KR); Min Sung Lee, Gyeonggi-do (KR); Chung Ha Kim, Gyeonggi-do (KR); Joo Ho Seo, Gyeonggi-do (KR); Han Gil Song, Gyeonggi-do (KR); Seung Ah Oh, Gyeonggi-do (KR); So Young Lee, Gyeonggi-do (KR); Jung Won Lee, Gyeonggi-do (KR); Jong Chul Choi, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 16/207,301

(22) Filed: Dec. 3, 2018

(65) Prior Publication Data

US 2019/0171254 A1 Jun. 6, 2019

(30) Foreign Application Priority Data

Dec. 1, 2017 (KR) .................. 10-2017-0164534

(51) Int. Cl.
*H05K 1/00* (2006.01)
*G06F 1/16* (2006.01)

(52) U.S. Cl.
CPC .......... *G06F 1/1652* (2013.01); *G06F 1/1626* (2013.01); *G06F 1/1637* (2013.01); *G06F 1/1647* (2013.01)

(58) Field of Classification Search
CPC .... G06F 1/1626; G06F 1/1637; G06F 1/1647; G06F 1/1652
See application file for complete search history.

(56) References Cited

U.S. PATENT DOCUMENTS

| 2005/0046779 A1* | 3/2005 | Sumi ................... G02F 1/13394 349/155 |
| 2010/0216514 A1 | 8/2010 | Smoyer et al. |

(Continued)

FOREIGN PATENT DOCUMENTS

| CN | 106406432 A | 2/2017 |
| KR | 10-2017-0067203 A | 6/2017 |
| KR | 10-2017-0084791 A | 7/2017 |

OTHER PUBLICATIONS

International Search Report dated Mar. 11, 2019.
(Continued)

*Primary Examiner* — Yuriy Semenenko
(74) *Attorney, Agent, or Firm* — Cha & Reiter, LLC

(57) ABSTRACT

An electronic device is disclosed herein, including a first face oriented in a first direction, the first face formed having a curvature and disposed as to be visible from an exterior of the electronic device, a body including a second face oriented towards a second direction opposite to the first direction, the second face visible from the exterior, and a display module visible when viewing the first face, the display module including a flexible display disposed under a window, and the window including a central visible area formed in a substantially rectangular shape including first, second, third and fourth visible areas disposed adjacent to four respective edges of the central visible area.

18 Claims, 19 Drawing Sheets

(56) References Cited

U.S. PATENT DOCUMENTS

| | | | |
|---|---|---|---|
| 2012/0073115 A1* | 3/2012 | Filson | G06F 1/1601 |
| | | | 29/592.1 |
| 2012/0194998 A1* | 8/2012 | McClure | G06F 1/1626 |
| | | | 361/679.56 |
| 2012/0243719 A1 | 9/2012 | Franklin et al. | |
| 2012/0314354 A1* | 12/2012 | Rayner | H05K 5/061 |
| | | | 361/679.01 |
| 2013/0294020 A1* | 11/2013 | Rayner | H05K 5/061 |
| | | | 361/679.01 |
| 2014/0111910 A1 | 4/2014 | Lin et al. | |
| 2014/0132488 A1 | 5/2014 | Kim et al. | |
| 2015/0138041 A1 | 5/2015 | Hirakata et al. | |
| 2015/0212784 A1 | 7/2015 | Myers | |
| 2015/0261376 A1 | 9/2015 | Kim et al. | |
| 2016/0113135 A1 | 4/2016 | Kim et al. | |
| 2017/0160463 A1 | 6/2017 | You et al. | |
| 2017/0205923 A1* | 7/2017 | Shim | G06F 3/0412 |
| 2018/0307269 A1* | 10/2018 | Pantel | G06F 1/1605 |

OTHER PUBLICATIONS

Nokia HumanForm, Oct. 26, 2011.
European Search Report dated Oct. 20, 2020.
Chinese Search Report dated Nov. 4, 2020.

\* cited by examiner

ELECTRONIC DEVICE WITH FULL-DISPLAY

CROSS REFERENCE TO RELATED APPLICATION(S)

This application is based on and claims priority under 35 U.S.C. § 119 to Korean Patent Application No. 10-2017-0164534, filed on Dec. 1, 2017, in the Korean Intellectual Property Office, the disclosure of which is incorporated by reference herein in its entirety.

BACKGROUND

1. Field

Certain embodiments of the present disclosure relate to an electronic device with a full-display.

2. Description of Related Art

A display may be disposed to a front face of a typical electronic device. The display may be implemented as a flat display or a curved display. Displays may be positioned to other areas of electronic device. For example, a curved display may be disposed at one or more edge areas of the flat display. Such a configuration may provide a new interface for usability and interaction with the electronic device.

SUMMARY

When an electronic device includes a display disposed to a front face, the electronic device may be configured to provide a wider display area by reducing a size of the bezel.

However, the amount of reduction in the bezel area may be limited due to the placement of sensors therein, such as optical sensors, home-keys, or the like, which are typically disposed to the front face of the electronic device.

Certain embodiments of the present disclosure may provide an electronic device with improved grip feeling.

Certain embodiments of the present disclosure may provide an electronic device capable of providing a full-display area to a front face.

Certain embodiments of the present disclosure can utilize not only a front face of an electronic device but also at least part of four respective lateral faces as a display area, thereby providing the electronic device with a convenient user interface environment.

Certain embodiments of the present disclosure may provide an electronic device having a good external appearance by implementing the entire front face as a 3-dimensionally curved face when viewed from the outside.

Certain embodiments of the present disclosure can provide an electronic device with improved grip feeling by implementing an active area of a display with a different curvature.

An electronic device is disclosed according to certain embodiments of the present disclosure. The electronic device may include a first face oriented in a first direction, the first face formed having a curvature and disposed as to be visible from an exterior of the electronic device, a body including a second face oriented towards a second direction opposite to the first direction, the second face visible from the exterior, and a display module visible when viewing the first face, the display module including a flexible display disposed under a window, and the window including a central visible area formed in a substantially rectangular shape including first, second, third and fourth visible areas disposed adjacent to four respective edges of the central visible area.

An electronic device is disclosed according to certain embodiments of the present disclosure. The electronic device may include a window formed in a front face of the electronic device and substantially including a first curvature, and a housing formed in a rear face of the electronic device, the housing at least partially circumferentially surrounding a periphery of the window, wherein at least one component of the electronic device is visible through the window, the at least one component including: a central visible area disposed substantially at a center portion of the window, and first, second, third and fourth visible areas extending towards the housing, the first, second, third and fourth visible areas including a second curvature.

The present disclosure can provide a more convenient and new user interfacing environment by implementing a front face as a full-display area and by implementing a display area also in at least part of four lateral faces, and in particular, can provide an electronic having a good external appearance by implementing the entire front face as a substantially 3-dimensionally curved face.

In addition, the present disclosure can provide an electronic device with improve grip feeling.

DETAILED DESCRIPTION

Figure 1A:
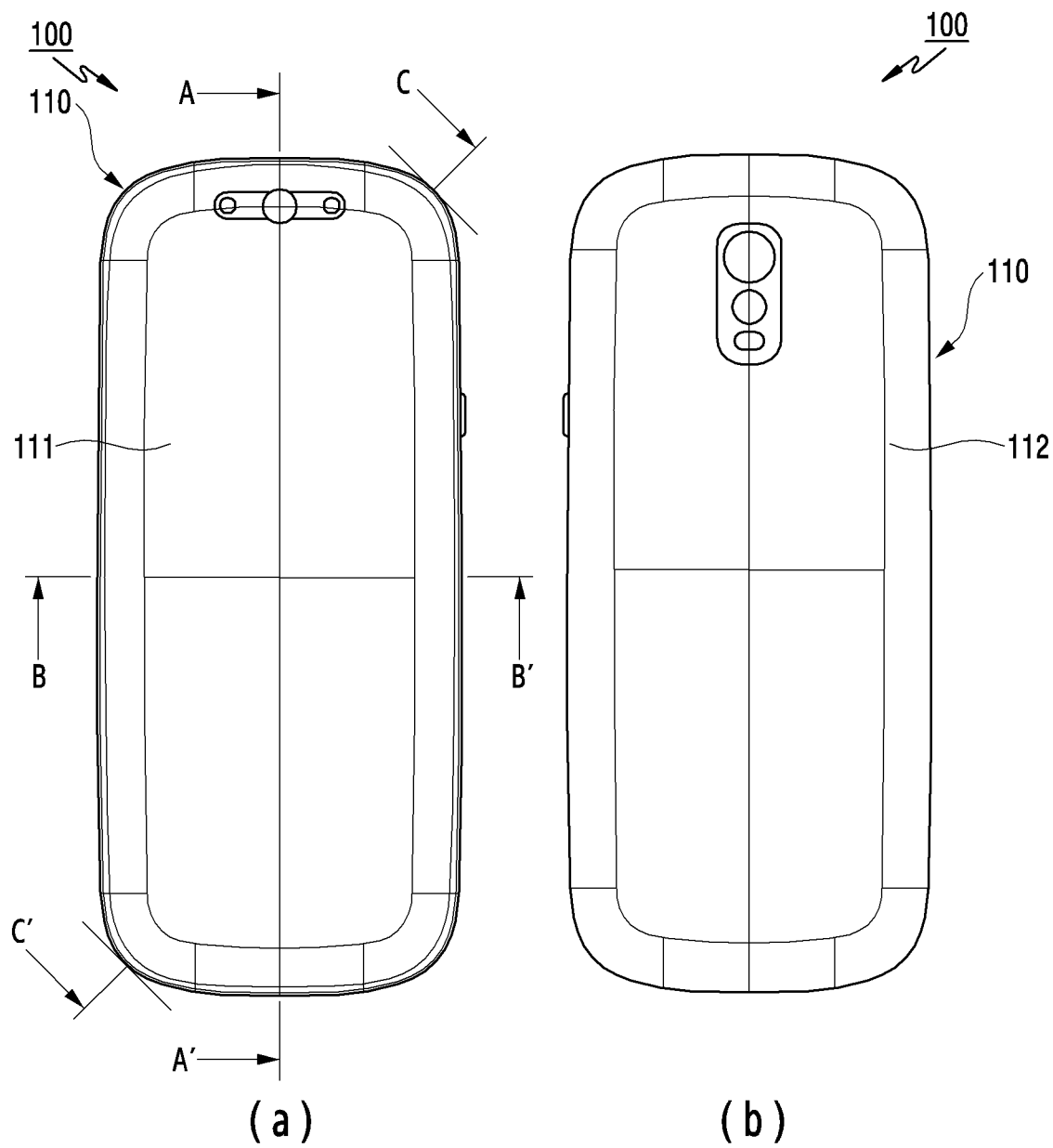
FIG. 1A illustrates an electronic device according to certain embodiments of the present disclosure, FIG. 1A(a) is a plan view, and FIG. 1A(b) is a bottom view.
Figure 1A:
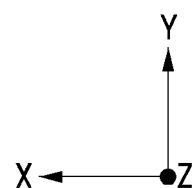

Hereinafter, certain embodiments of the present disclosure are described with reference to the accompanying drawings. It should be appreciated, however, it is not intended to limit the embodiments of the present disclosure to the particular form disclosed, but, on the contrary, it is intended to cover all modifications, equivalents, and alternatives falling within the embodiments of the present disclosure. Like reference numerals denote like elements throughout the drawings.

An electronic device according to certain embodiments of the present disclosure may be at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), an electronic costume, an electronic bracelet, an electronic necklace, an electronic appcessory, an electronic tattoo, a smart mirror, and a smart watch).

Figure 1B:
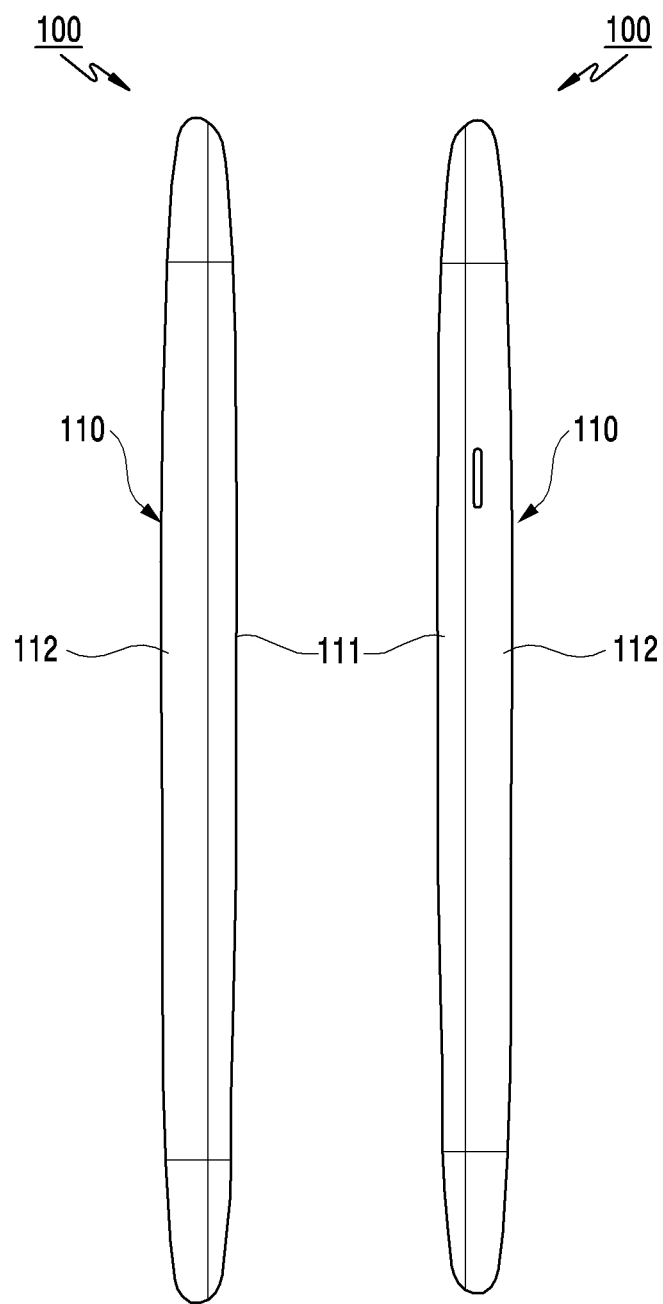
FIG. 1B illustrates an electronic device according to certain embodiments of the present disclosure, FIG. 1B(c) is one lateral view, and FIG. 1B(d) is the other lateral view.
Figure 1C:
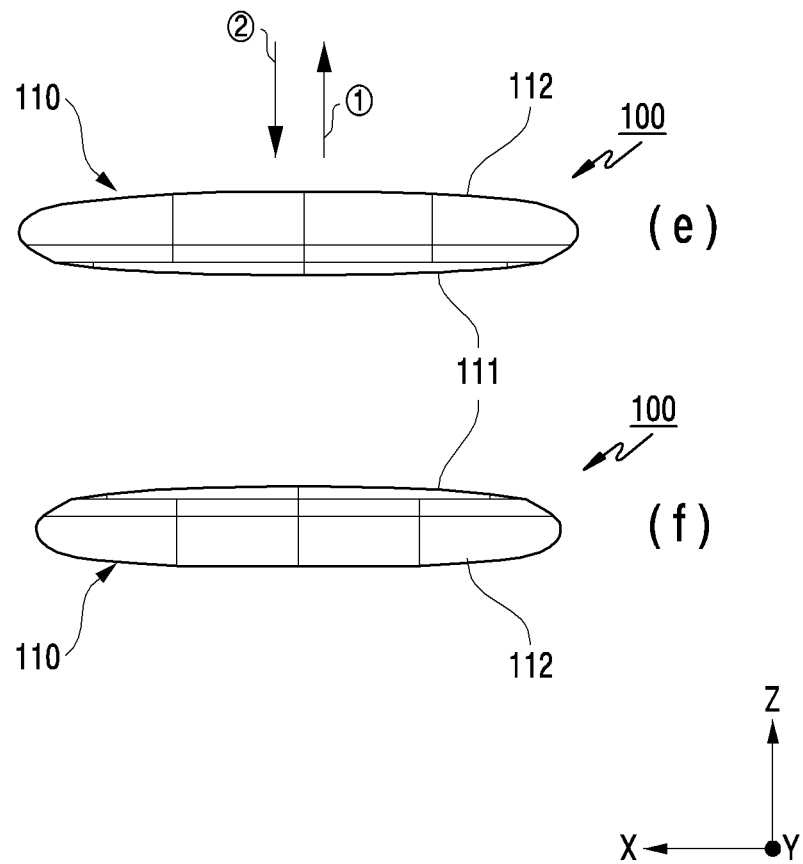
FIG. 1C illustrates an electronic device according to certain embodiments of the present disclosure, FIG. 1C(e) is a front view, and FIG. 1C(f) is a rear view.

FIG. 1A illustrates an electronic device according to certain embodiments of the present disclosure. FIG. 1A(a) is a plan (or planar; top) view, and FIG. 1A(b) is a bottom view. FIG. 1B illustrates an electronic device according to certain embodiments of the present disclosure. FIG. 1B(c) is one lateral view, and FIG. 1B(d) is the other lateral view. FIG. 1C illustrates an electronic device according to certain embodiments of the present disclosure. FIG. 1C(e) is a front view, and FIG. 1C(f) is a rear view.

A rectangular coordinate system may be used in the description of an electronic device 100 according to certain embodiments of the present disclosure with reference to FIG. 1A to FIG. 1C. An X-axis may refer to a widthwise direction of the electronic device 100, a Y-axis may mean a lengthwise direction of the electronic device 100, and a Z-axis may mean a thickness direction of the electronic device 100. A (+)Z-axis may mean a first direction, and a (−)Z-axis may mean a second direction opposite to the first direction.

Referring to FIG. 1A to FIG. 1C, the electronic device 100 according to certain embodiments of the present disclosure may be a device with a full-display. The full-display means that a first face of the electronic device 100 can be fully utilized as a display area without a bezel, and may be described succinctly herein as bezel-less. In addition, the electronic device 100 according to certain embodiments of the present disclosure may be a device having a 3-dimensional curved external surface. In addition, the electronic device according to certain embodiments of the present disclosure may be a device which can utilize at least part of four lateral faces of a body as a visible display area.

The electronic device 100 according to certain embodiments may include one body 110. The body 110 according to certain embodiments may include a first face 111 facing a first direction (①) and visible outside the electronic device 100 and a second face 112 facing a second direction (②) opposite to the first direction (①) and visible outside the electronic device 100. For example, the first face 111 may be referred to as a front or upper face of the electronic device 100, and may be an outer surface which is visible from the outside. The second face 112 may be referred to as a rear or bottom face of the electronic device 100. A window may be disposed visibly on the first face 111, and the second face 112 may be implemented by a housing. An external appearance of the body 110 may be implemented by combining the housing and the window. For example, the housing may be implemented by certain materials such as metal, plastic, ceramic, or the like.

The housing including the second face 112 is integrally implemented up to a lateral portion of the body 110, and surrounds a periphery of the window including the first face 111. The housing including the second face 112 and lateral face of the body 110 may be implemented with a metal material to serve as an antenna radiator. Although not shown, glass may be added to the second face 112 of the body 110, and thus the first face 111 and the second face 112 may be implemented with glass. The housing may be located at a lateral portion created by two pieces of glass, and thus the housing may serve as the antenna radiator.

The first face 111 of the body 110 according to certain embodiments may be implemented as a substantially 3-dimensionally curved face. For example, the curved face including the first face 111 may be implemented to have a curvature, and may be implemented to have at least one curvature. The first face 111 may include a first curved face having a first curvature and a second curved face having a second curvature. The first face 111 may extend in a curved face shape in a direction of each corner portion of the body 110. In addition, the first face 111 may extend in a curved face shape in a direction of each lateral face of the body 110 from a center.

Figure 2A:
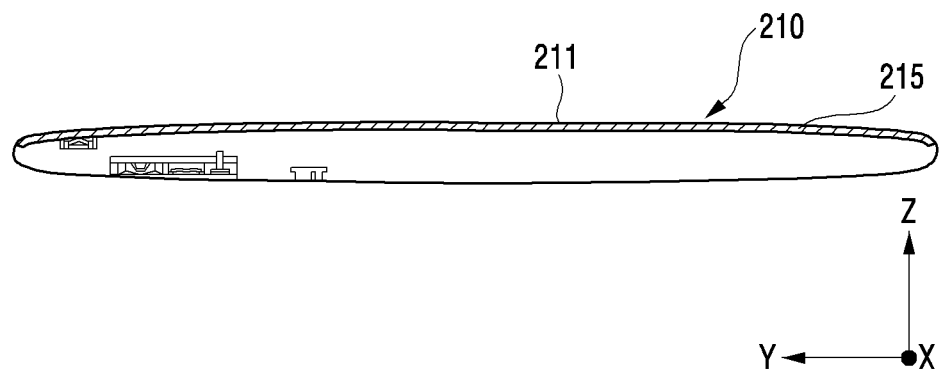
FIG. 2A is a cross-sectional view briefly illustrating a structure of a window of an electronic device, cut along the line B-B' of FIG. 1A(a)
Figure 2B:
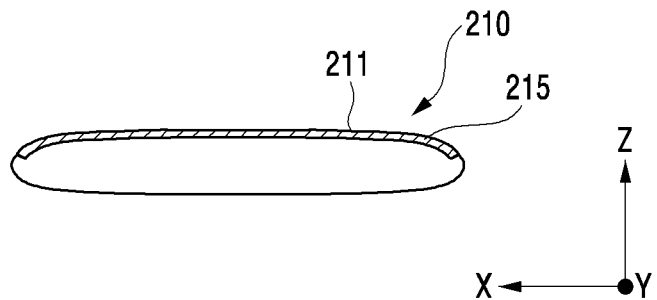
FIG. 2B is a cross-sectional view briefly illustrating a structure of a window of an electronic device, cut along the line C-C' of FIG. 1A(a)
Figure 2C:
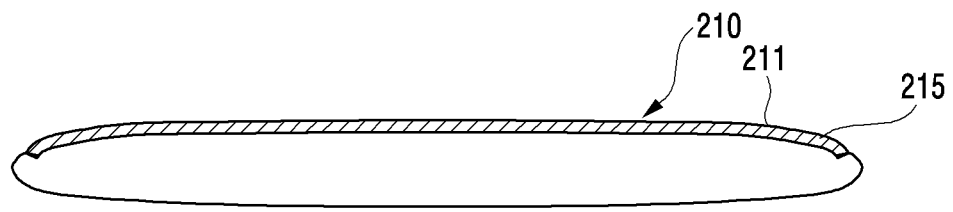
FIG. 2C is a cross-sectional view briefly illustrating a structure of a window of an electronic device, cut along the line A-A' of FIG. 1A(a)

FIG. 2A is a cross-sectional view briefly illustrating a structure of a window of an electronic device, cut along the line B-B' of FIG. 1A(a). FIG. 2B is a cross-sectional view briefly illustrating a structure of a window of an electronic device, cut along the line C-C' of FIG. 1A(a). FIG. 2C is a cross-sectional view briefly illustrating a structure of a window of an electronic device, cut along the line A-A' of FIG. 1A(a).

Referring to FIG. 2A to FIG. 2C, a body 210 according to certain embodiments may be implemented identically to the body 110 of FIG. 1A to FIG. 1C. A window 215 including a first face 211 of the body 210 according to certain embodiments may be implemented in a substantially 3-dimensionally curved shape. As an outer surface of the window 215, the first face 211 may be implemented as a substantially 3-dimensionally curved face. For example, the first face 211 may have a curvature.

Figure 3A:
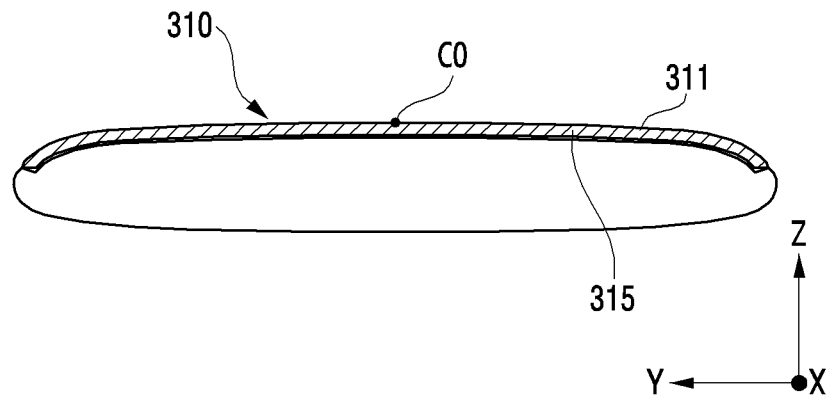
FIG. 3A, FIG. 3B and FIG. 3C are cross-sectional views briefly illustrating respective structures of certain windows of an electronic device according to certain embodiments of the present disclosure.
Figure 3B:
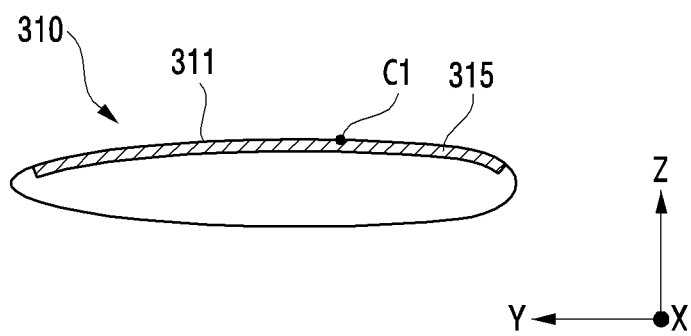
Figure 3C:
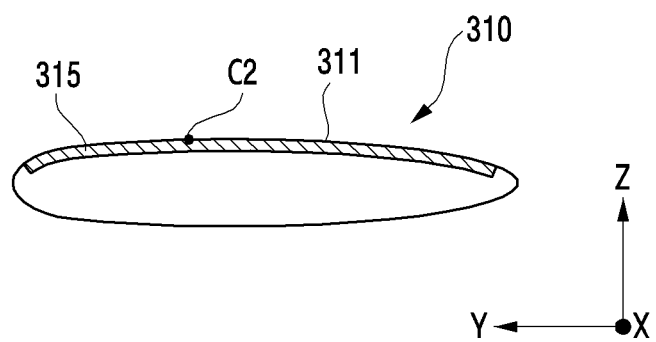

FIG. 3A to FIG. 3C are cross-sectional views briefly illustrating respective structures of certain windows of an electronic device according to certain embodiments of the present disclosure.

Referring to FIG. 3A to FIG. 3C, a body 310 according to certain embodiments may be implemented identically to the body 110 of FIG. 1A to FIG. 1C. A first face 311 of the body 310 according to certain embodiments may have a most curved inflection point at a center C0 of the first face 311 of a window 315 (see FIG. 3A).

In addition, when the window 315 is bisected into upper and lower portions (when it is bisected along a Y-axis), the most-curved inflection point may be located at a center C1 of the upper portion (see FIG. 3B), or may be located at a center C2 of the lower portion (see FIG. 3C).

Figure 4A:
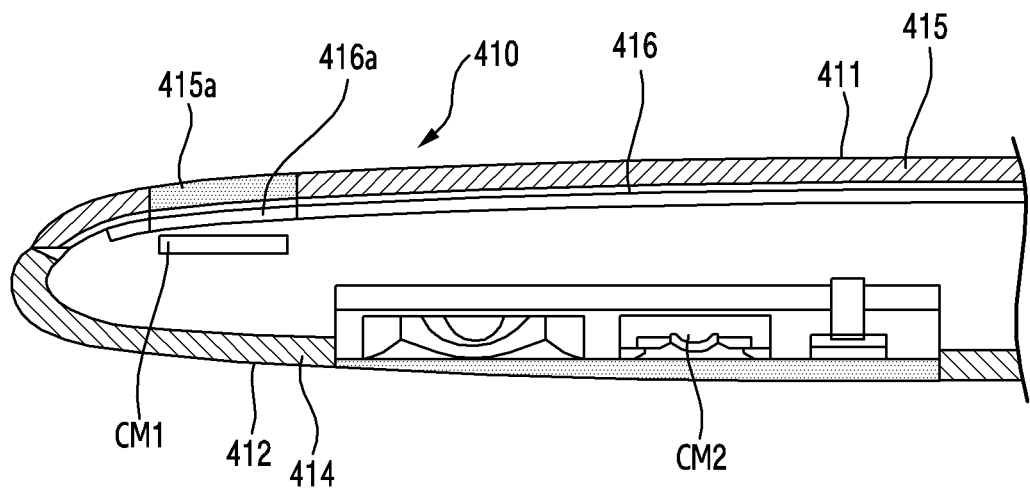
FIG. 4A and FIG. 4B are cross-sectional views illustrating respective states where front and rear cameras are mounted to a body according to certain embodiments of the present disclosure.
Figure 4B:
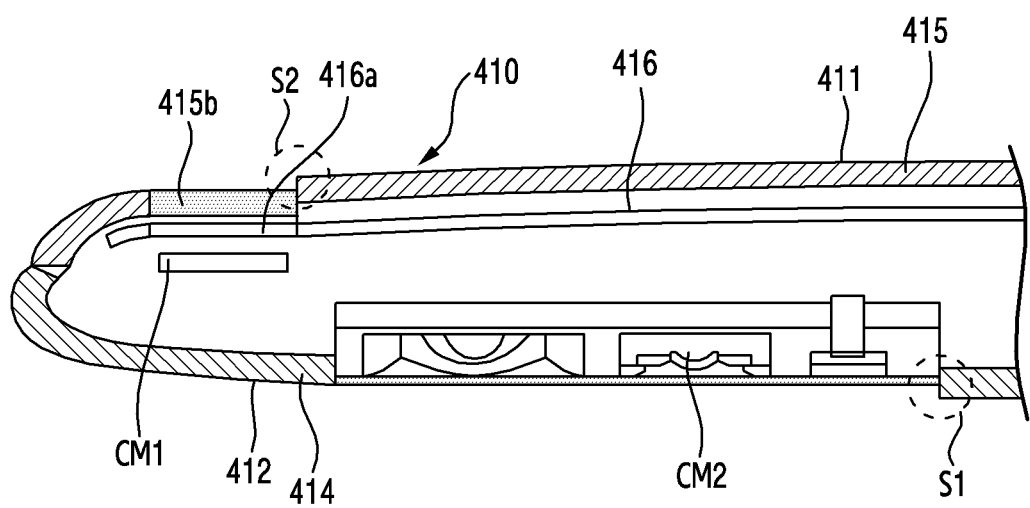

FIG. 4A and FIG. 4B are cross-sectional views illustrating respective states where front and rear cameras are mounted to a body according to certain embodiments of the present disclosure.

Referring to FIG. 4A, the body, according to certain embodiments, may be implemented identically as the body 110 of FIG. 1A to FIG. 1C. A body 410 according to certain embodiments may combine a window 415 and a housing 414. The body 410 may have a first camera module CM1 mounted to a first face 411, and the body 410 may have a second camera module CM2 mounted to a second face 412. For example, the first camera module CM1 may be a front camera, and the second camera module CM2 may be rear camera. The rear camera CM2 may be implemented as a dual camera module (e.g., including two cameras).

The first camera module CM1 according to certain embodiments may be oriented in a second direction of a flexible display 416. For an optical operation of the first camera module CM1, an opening 416a may be implemented by providing an opening (e.g., cutting) in a first portion of the flexible display 416 facing the first camera module CM1. A second portion 415a of the window 415 facing the opening 416a may be implemented as a curved face, which may result in image distortion due to the curvature. To prevent this distortion, a structure having a compensatory refractive index may be additionally be provided in the second portion 415a of the window. The compensatory structure may be mounted with a tilt having a similar distance between a barrel end of the first camera module CM1 and the window 415. In addition, in order for the first camera module CM1 to be mounted to the window 415, a corresponding window face may be disposed flatly as to surround part of the barrel.

The second portion 415a according to certain embodiments may be implemented to be coplanar with the first face 411 without including a step difference. Therefore, the second portion 415a and the first face 411 may be implemented as to present a continuously smooth surface.

The second camera module CM2 according to certain embodiments may be disposed to the second face 412 of the body, that is, a bottom face of the housing 414. The second camera module CM2 may be disposed to be coplanar with the second face 412, and thus may not have a step difference.

Referring to FIG. 4B, the body 410 according to certain embodiments may have the first camera module CM1 disposed to the first face 411 and the second camera module CM2 mounted to the second face 412. For example, the first camera module CM1 may be a front camera, and the second camera module CM2 may be rear camera. The rear camera CM2 may be implemented by a dual camera module.

The first camera module CM1 according to certain embodiments may be oriented towards a second direction of the flexible display 416. For an optical operation of the first camera module CM1, the opening 416a may be implemented by cutting a first portion of the flexible display 416 facing the first camera module CM1. The second portion 415b of the window, facing the opening 416a, may be disposed in parallel, and thus the second portion 415b according to certain embodiments may have a step difference S2 with respect to the first face.

The second camera module CM2 according to certain embodiments may be disposed to the second face 412 of the body, that is, the bottom face of the housing 414. The second camera module CM2 may be disposed to be parallel with the bottom face of the housing, and thus may have the step difference S1.

Figure 5:
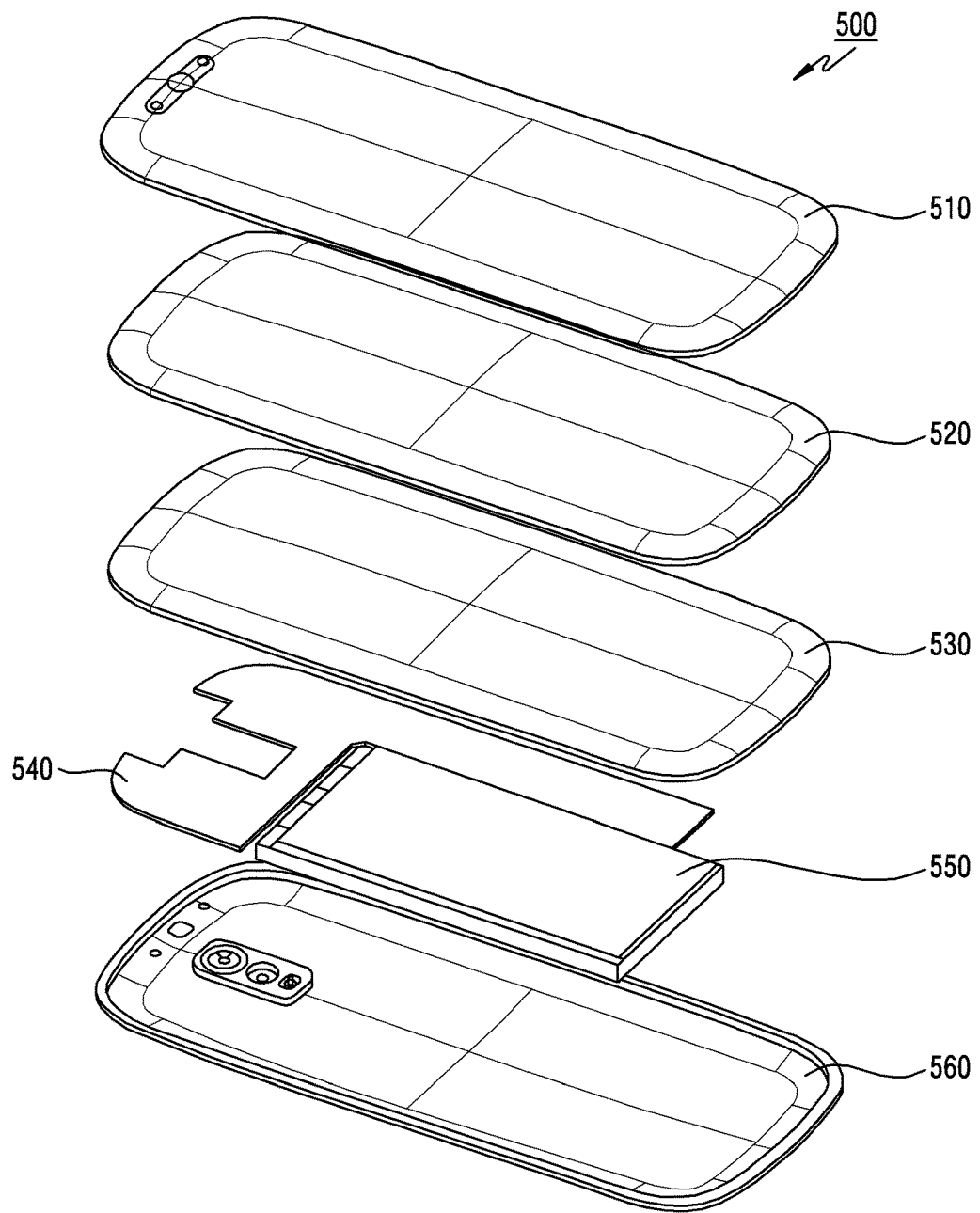
FIG. 5 is an exploded perspective view briefly illustrating an electronic device according to certain embodiments of the present disclosure.

FIG. 5 is an exploded perspective view briefly illustrating an electronic device according to certain embodiments of the present disclosure.

Referring to FIG. 5, an electronic device 500 according to certain embodiments may be implemented identically to the body 110 of FIG. 1A to FIG. 1C. The electronic device according to certain embodiments may include a front plate 510, a flexible display 520, a printed circuit board 540, a battery 550, a support member 530, and a rear plate 560. In some embodiments, at least one of the components of the electronic device 500 may be the same as or similar to at least one of the components of the electronic device 100 of FIG. 1A to FIG. 1C, and redundant descriptions will be omitted hereinafter.

The front plate 510 (e.g., a window, according to certain embodiments) may be implemented in a 3-dimensional external curved face. The front plate 510 may be implemented such that an outer surface visible from the outside is a substantially 3-dimensionally curved face. Hereinafter, the front plate 510 is referred to as a "window." The window 510 may include a central visible area (e.g., 610 of FIG. 6) and first to fourth visible areas (e.g., 621 to 624 of FIG. 6) located at each side of the central visible area. The visible area may be an area which is visible through the window.

The flexible display 520 according to certain embodiments may be implemented to be in contact with the front plate 510. As will be described below, the flexible display 520 may include the central visible area (e.g., 610 of FIG. 6) and the first to fourth visible areas (e.g., 621 to 624 of FIG. 6).

The flexible display 520 according to certain embodiments may be implemented in a curved face shape in a direction of each corner portion or in each lateral direction.

For example, the flexible display 520 may be implemented such that the central visible area has a flat face or a curved face having a curvature, four visible areas have a curved face having a curvature, and four visible lateral areas have a flat face or a curved face having a curvature.

The support member 530 according to certain embodiments may be implemented by a metal material and/or a non-metal (e.g., polymer) material. The support member 530 may be exposed to the outside to protect a circuit board, a battery, or the like, and may be utilized as an antenna.

The display 520 may be bonded to one face of the support member 530, and the printed circuit board 540 may be bonded to the other face thereof. A processor, a memory, and/or an interface may be mounted to the printed circuit board 540. The processor may include, for example, one or more of a central processing unit, an application processor, a graphic processing unit, an image signal processor, a sensor hub processor, and a communication processor. The memory according to certain embodiments may include, for example, a volatile memory or a non-volatile memory. The interface according to certain embodiments may include, for example, a High Definition Multimedia Interface (HDMI), a Universal Serial Bus (USB) interface, a Secure Digital (SD) card interface, and/or an audio interface. For example, the interface may electrically or physically couple the electronic device 500 and an external electronic device, and may include a USB connector, an SD card/MMC connector, or an audio connector.

As a device for supplying power to at least one component of the electronic device 500, the battery 550 according to certain embodiments may include, for example, a non-rechargeable primary cell, a rechargeable secondary cell, or a fuel cell. At least part of the battery 550 may be disposed substantially to be coplanar with, for example, the printed circuit board 540. The battery 550 may be disposed integrally inside the electronic device 500, or may be disposed detachably from the electronic device 500.

An antenna (not shown) of the electronic device may be disposed between a rear plate 580 and the battery 550. The antenna may include, for example, a Near Field Communication (NFC) antenna, a wireless charging antenna, and/or a Magnetic Secure Transmission (MST) antenna. The antenna may perform short-range communication, for example, with the external electronic device, or may wirelessly transmit/receive power utilized for charging.

As a housing, the rear plate 560 according to certain embodiments may be integrally implemented up to a lateral face of the electronic device 500. For example, the rear plate 560 may be implemented by metal to serve as an antenna radiator. Glass may be additionally positioned on at least part of the rear plate 560.

Figure 6:
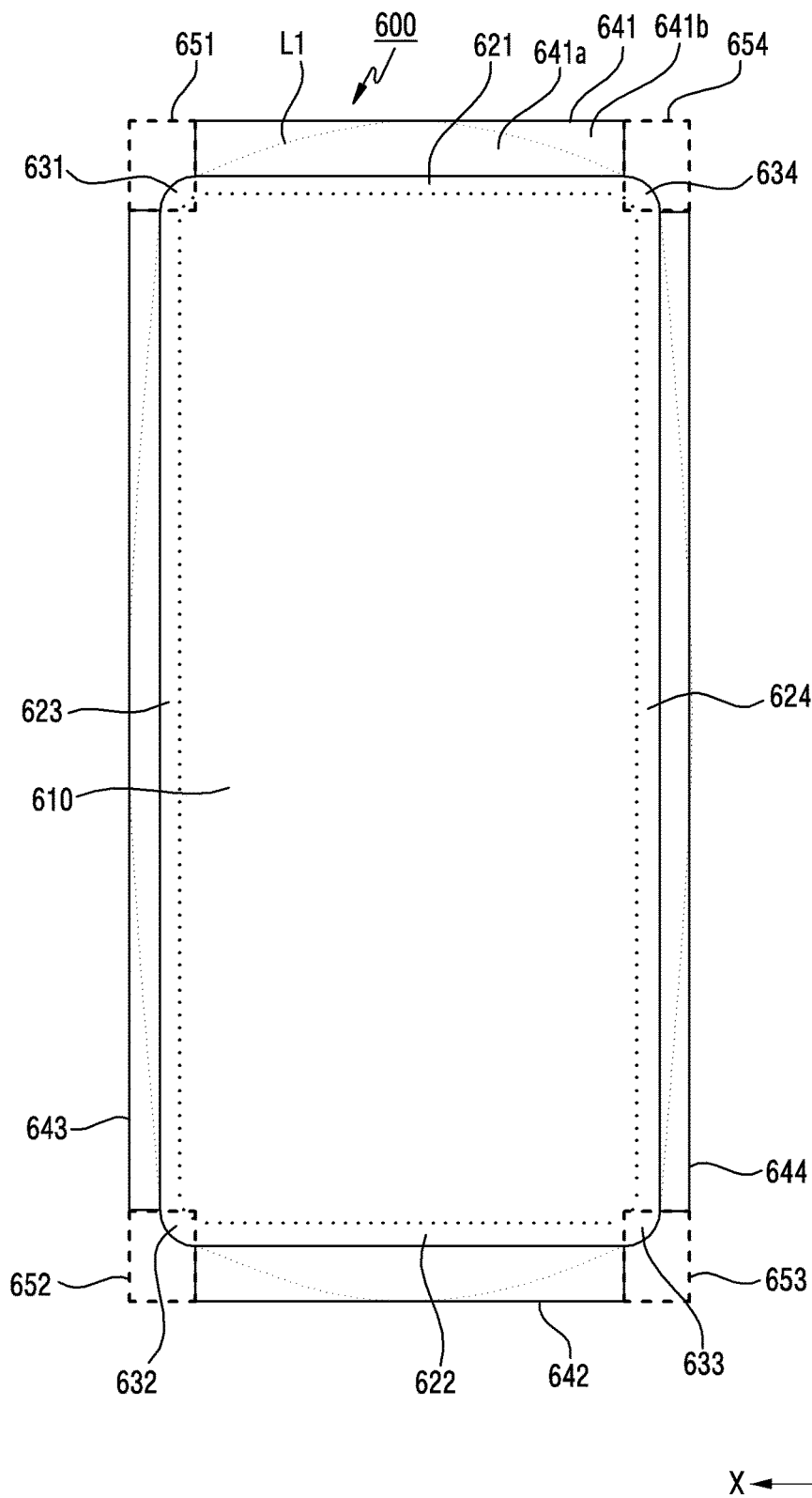
FIG. 6 is a plan view illustrating a flexible display employed in an electronic device according to certain embodiments of the present disclosure.

FIG. 6 is a plan view illustrating a flexible display employed in an electronic device according to certain embodiments of the present disclosure.

Referring to FIG. 6, a first face of a body according to certain embodiments may include at least one visible area which is visible outside the body. The visible area is an area which is visible from the outside, and may be referred to as an active area.

A flexible display 600 according to certain embodiments may be implemented identically to the flexible displays 416 and 520 of FIG. 4A, FIG. 4B, and FIG. 5. The flexible display 600 according to certain embodiments may include at least one visible area. The visible area according to certain embodiments may include a central visible area 610 which has a substantially rectangular shape when a first face is viewed vertically from above, and first to fourth visible areas 621 to 624 which are located along respective sides of the central visible area 610 and which are visible from the outside. For example, the central visible area 610 is not necessarily limited to the rectangular shape, and thus may be implemented in certain shapes. The central visible area 610 has a substantially rectangular shape, and thus may include four sides.

The central visible area 610 according to certain embodiments may be a display area which is visible when the body is viewed from the front face, and each of the first to fourth visible areas 621 to 624 may be a display area which is visible when the body is viewed from the front face and the lateral face.

In addition, the visible area of the flexible display 600 according to certain embodiments may be implemented to have at least one curvature. For example, the central visible area 610 may be implemented as a flat face or a first curved face having a first curvature, and each of the first to fourth visible areas 621 to 624 may include a curved face having a second curvature. The first curved face may be the central visible area 610, and the second curved face may be each of the first to fourth visible areas 621 to 624. The curvature of the central visible area 610 may be implemented to be different from the curvature of the first to fourth visible display areas 621 to 624 (e.g., display areas).

The first to fourth visible areas 621 to 624 according to certain embodiments may be areas utilized to implement a front bezel-less face for the electronic device. In addition, the first to fourth visible lateral areas 641 to 644 may display images different from those of the central visible area 610, the first to fourth visible areas 621 to 644, and first to fourth visible corner areas 631 to 634. For example, the first to fourth visible lateral areas 641 to 644 may be used as areas for providing an additional function such as a physical key which is removed to implement a seamless design by removing a lateral physical key.

When the first face of the body is viewed vertically from above, the first visible area 621 according to certain embodiments may be disposed to an upper end side of the central visible area 610, the second visible area 622 may be disposed to a lower end side of the central visible area 610, the third visible area 623 may be disposed to a left lateral side of the central visible area 610, and the fourth visible area 624 may be disposed to a right lateral side of the central visible area 610. Each of the first to fourth visible areas 621 and 624 may be implemented to have a uniform width.

Among the first to fourth visible areas 621 to 624 according to certain embodiments, a visible corner area may be further included to couple between two visible areas adjacent to each other. For example, the two visible areas may be coupled to each other by means of the visible corner area. The visible corner area may be implemented in a shape having a curvature, and may be implemented to have a uniform width.

The visible corner area according to certain embodiments may further include the first visible corner area 631 which couples between the first and third visible areas 621 and 623, the second visible corner area 632 which couples between the second and third visible areas 622 and 623, the third visible corner area 633 which couples between the second and fourth visible areas 622 and 624, and the fourth visible corner area 634 which couples between the first and fourth visible areas 621 and 624.

The first visible area 621 according to certain embodiments may extend along a side located at an upper end of the central visible area 610. The second visible area 622 may extend along a side located at a lower end of the central visible area 610. The third visible area 623 may extend along a side located at one lateral end of the central visible area 610. The fourth visible area 624 may extend along a side located at the other lateral end of the central visible area 610.

Each of the first to fourth corner areas 631 to 634 according to certain embodiments may be implemented in a shape having a curvature.

The first to fourth visible areas 621 to 624 according to certain embodiments may respectively further include the first to fourth visible lateral areas 641 to 644. Each of the first to fourth visible lateral areas 641 to 644 may be disposed to be spaced apart from each other.

For example, a portion between the first and third visible lateral areas 641 and 643 and the first visible corner area 631 may be cut. The cut portion is indicated by a reference numeral 651. A portion between the second and third visible lateral areas 642 and 643 and the second visible corner area 632 may be cut. The cut portion is indicated by a reference numeral 652. A portion between the second and fourth visible lateral areas 642 and 644 and the third visible corner area 633 may be cut. The cut portion is indicated by a reference numeral 653. A portion between the first and fourth visible lateral areas 641 and 644 and the fourth visible corner area 634 may be cut. The cut portion is indicated by a reference numeral 654. Each of the cut portions 651 to 654 is for preventing an elongation difference occurring in each corner area when a pressing process is performed by combining the flexible display 600 and a window. In addition, part of an additional instrument, for example, a support member (e.g., 530 of FIG. 5), may be located to maintain flatness of the display.

Each of the first to fourth visible lateral areas 641 to 644 may fully or partially operate as a display area. If the first visible lateral area 641 partially operates as the display area, a reference numeral 641a may be the display area, and a reference numeral 641b may be a non-display area. A dotted line L1 may represent a border line of the display area and the non-display area. The second to fourth visible lateral areas 642 to 644 may be implemented identically to a first visible lateral area.

Each of the first to fourth visible lateral areas 641 to 644 according to certain embodiments may be implemented of a non-visible area. In addition, among the first to fourth visible lateral areas 641 to 644 according to certain embodiments, one, two, or three visible lateral areas may be implemented of the non-visible area.

The flexible display 600 according to certain embodiments may be coupled integrally by combining the first to fourth visible areas 621 to 624 and the first to fourth visible corner areas 631 to 634, and may be disposed in a shape of a closed curve.

The flexible display 600 according to certain embodiments may have a maximum curvature value to reduce (e.g., even to a minimal value) screen distortion in the central visible area 610, and may have a minimum curvature value in the first to fourth visible areas 621 to 624. Therefore, a curvature value in the central visible area 610 may be greater than a curvature value in the first to fourth visible areas 621 to 624.

The aforementioned visible area may be an area which is visible through the window. Visible areas (e.g., the central visible area, the visible lateral area, the visible corner area, or the like) provided in the flexible display 600 may be an active area which operates as a display area.

Figure 7A:
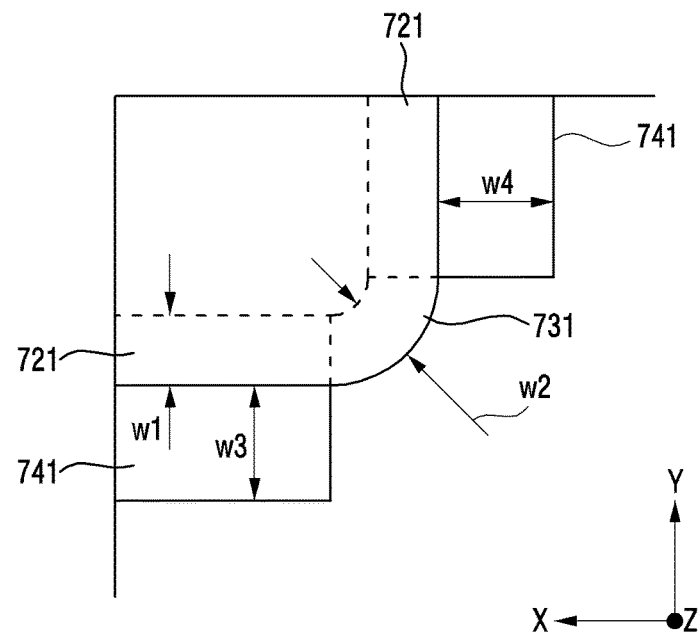
FIG. 7A is an enlarged view of one corner portion of a flexible display according to certain embodiments of the present disclosure.

FIG. 7A is an enlarged view of one corner portion of a flexible display according to certain embodiments of the present disclosure.

Referring to FIG. 7A, an area of a visible corner area 731 (or display) according to certain embodiments may be configured identically to each of the first to fourth visible corner areas 631 to 634 as depicted in FIG. 6. A width w2 of the visible corner area 731 according to certain embodiments may be configured to be uniform. However, widths of corner display areas may be configured to be different from one another, or otherwise configured non-uniformly.

A width w1 of each visible area 721 according to certain embodiments and the width w2 of each visible corner area 731 may be configured to be identical to each other. For example, the width w1 of each visible area and the width w2 of each visible corner area may be configured to be different from each other.

In addition, widths w3 and w4 of each visible lateral area 741 according to certain embodiments may be configured to be identical to each other. The widths w3 and w4 of each visible lateral area may be configured to be different from each other, and may be non-uniformly configured.

Figure 7B:
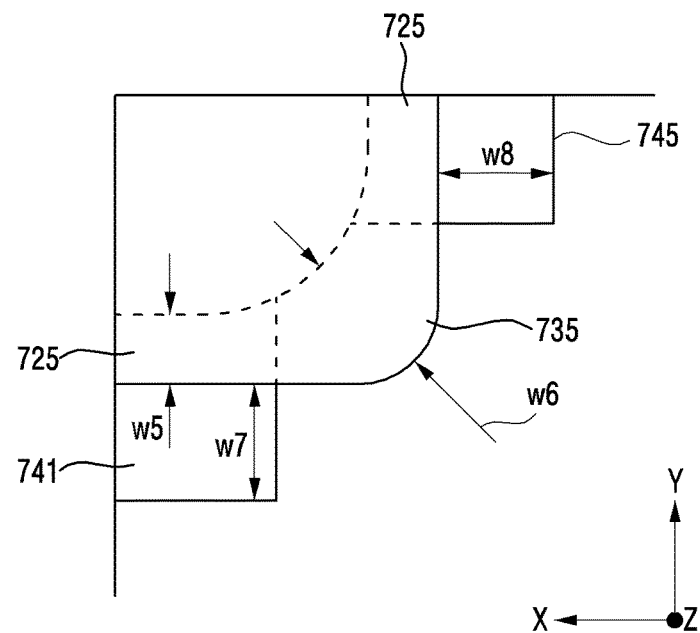
FIG. 7B is an enlarged view of one corner portion of a flexible display according to certain embodiments of the present disclosure.

FIG. 7B is an enlarged view of one corner portion of a flexible display according to certain embodiments of the present disclosure.

Referring to FIG. 7B, a width of a visible corner area 735 according to certain embodiments may be configured non-uniformly. In addition, a maximum width w6 of the visible corner area 735 may be configured to be greater than a width w5 of a visible area 725.

In addition, widths w7 and w8 of a visible lateral area 745 according to certain embodiments may be configured to be identical to each other. The widths w7 and w8 of each visible lateral area 745 may be configured to be different from each other, or may be configured non-uniformly.

Figure 8:
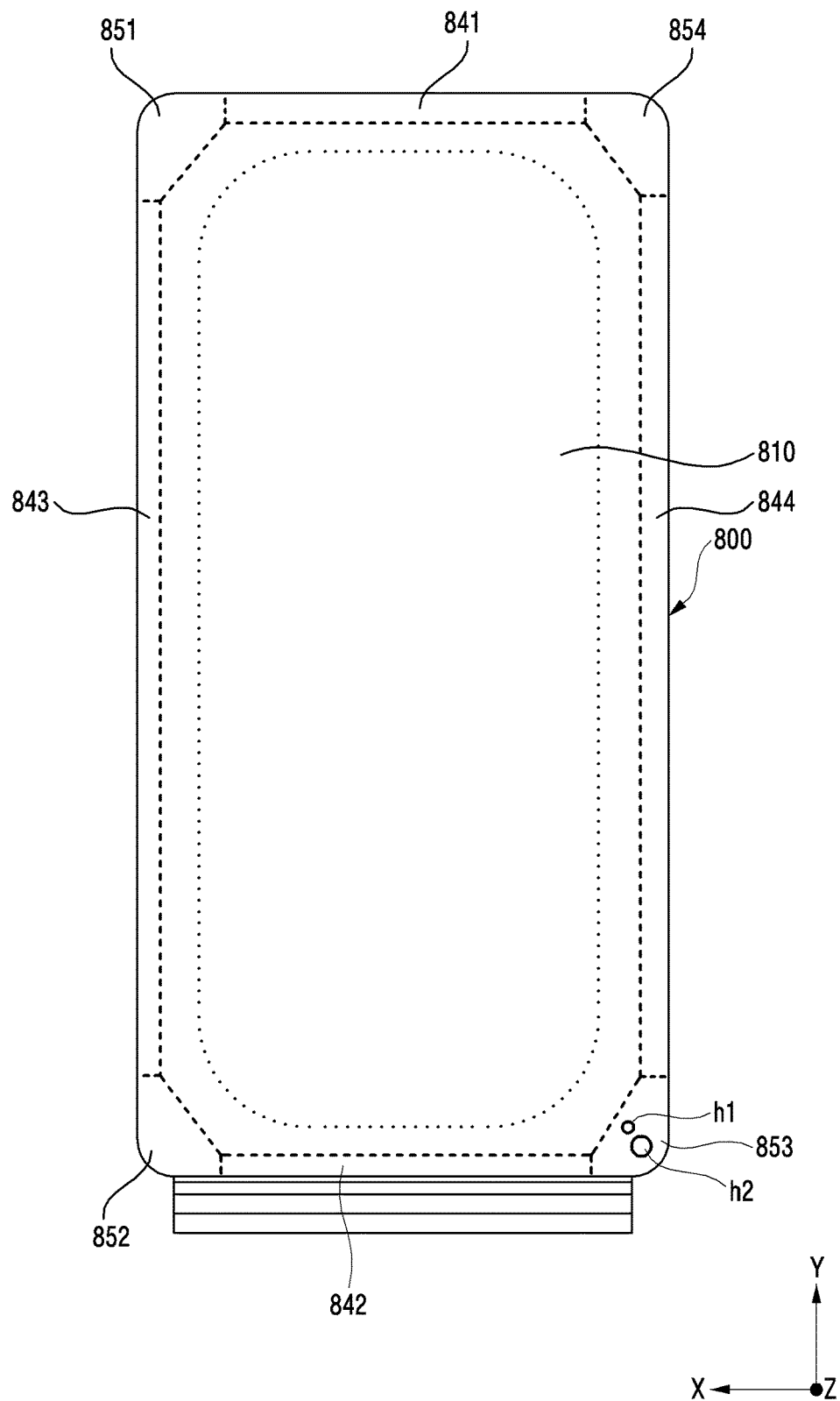
FIG. 8 is a plan view illustrating a flexible display employed in an electronic device according to certain embodiments of the present disclosure.

FIG. 8 is a plan view illustrating a flexible display employed in an electronic device according to certain embodiments of the present disclosure.

Referring to FIG. 8, a flexible display 800 according to certain embodiments may further include a visible lateral corner area which couples between two visible lateral areas adjacent to each other.

For example, a first non-visible corner area 851 may be located between first and third visible lateral corner areas 841 and 843. A second non-visible corner area 852 may be located between second and third visible lateral corner areas 842 and 843. A third non-visible corner area 853 may be located between second and fourth lateral corner areas 842 and 844. A fourth non-visible corner area 854 may be located between first and fourth corner areas 841 and 844.

At least one or more holes h1 and h2 may be disposed to at least one or more of the first to fourth non-visible corner areas 851 to 854 according to certain embodiments. The holes h1 and h2 may be disposed to utilize the different in area resulting from the elongation (as depicted in FIG. 8). For example, the holes h1 and h2 may be microphone holes. When the plurality of holes h1 and h2 are disposed to a non-visible corner area, the farther the distance from a center of a central visible area 810, the greater the size of the holes to be implemented, taking advantage of the additional space. For example, the hole h2 may have a greater diameter than the hole h1. With this structure, reduction in the display size can be prevented when the display 800 is stacked on the window.

Figure 9:
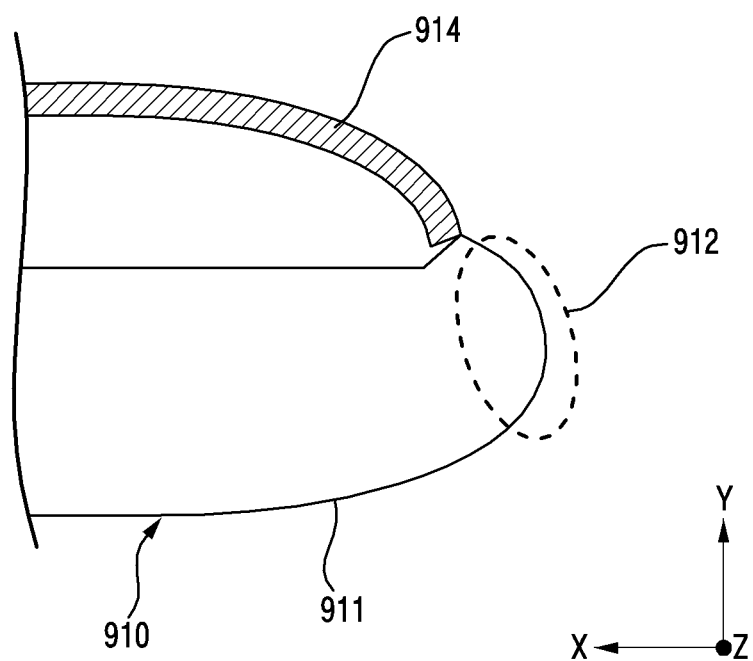
FIG. 9 is a cross-sectional view of a border portion where a housing of an electronic device is combined with a window according to certain embodiments of the present disclosure.

FIG. 9 is a cross-sectional view of a border portion where a housing of an electronic device is combined with a window according to certain embodiments of the present disclosure.

Referring to FIG. 9, a body 910 according to certain embodiments may be implemented identically to the body 110 of FIG. 1A to FIG. 1C. The body 910 according to certain embodiments may have a housing 911 implemented as a portion 912 which more protrudes than a window 914 near a border with respect to the window 914. For example, a curvature of the housing 911 near the border with respect to the window 914 may be configured to be smaller than a curvature of the window 914. The protruding portion 912 of the body is for minimizing a crack or breakage of the window 914, which may occur when the body falls.

Figure 10A:
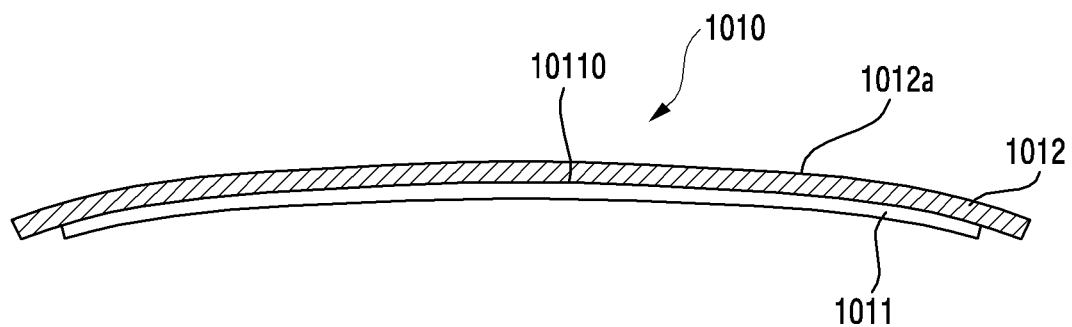
FIG. 10A and FIG. 10B are cross-sectional views illustrating respective structures of combining a flexible display and a window according to certain embodiments of the present disclosure.
Figure 10B:
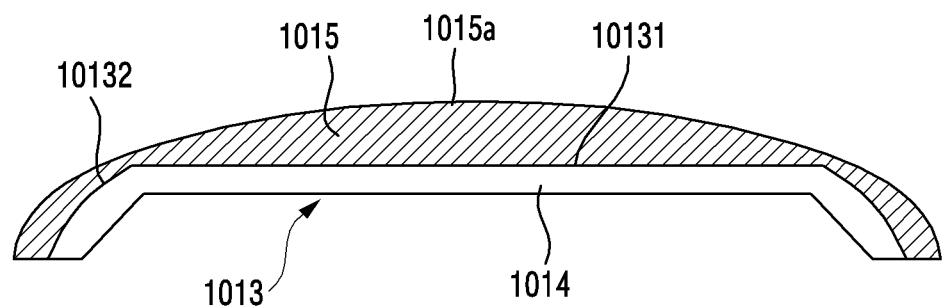

FIG. 10A and FIG. 10B are cross-sectional views illustrating respective structures of combining a flexible display and a window according to certain embodiments of the present disclosure.

Referring to FIG. 10A, a display module 1010 of a body according to certain embodiments may include a flexible display 1011 and a window 1012 disposed to one face of the flexible display 1011. The window 1012 according to certain embodiments may be implemented to have a surface 1012a which is visible substantially from the outside as a 3-dimensional curved face and to have a uniform thickness. In addition, the window 1012 according to certain embodiments may be implemented in a shape having a curvature.

The flexible display 1011 according to certain embodiments may be joined to the window 1012. For example, the flexible display 1011 may be implemented to have the same curvature as the window 1012. A joining face 10110 between the window 1012 and the flexible display 1011 may be a curved face. Accordingly, a uniform screen may be implemented irrespective of a direction from which a screen displayed on the display is visible.

Referring to FIG. 10B, a display module 1013 of a body according to certain embodiments may include a flexible display 1014 and a window 1015 joined to one face of the flexible display 1014. The window 1015 according to certain embodiments may be implemented to have a surface 1015*a* which is visible substantially from the outside as a 3-dimensional curved face and to have a non-uniform thickness. In addition, the surface 1015*a* in a first direction of the window 1015 according to certain embodiments may be implemented in a shape having a curvature.

The flexible display 1014 according to certain embodiments may be joined to the window 1015. For example, a joining face between the window 1015 and the flexible display 1014 may be a combination of a flat face 10131 and a curved face 10132. The curved face 10132 may have a curvature, and may have at least one curvature. The joining face may use a combination of the curved face 10132 and the flat face 10132 to visually identify the flat face 10131 and the curved face 10132 by using a light refractive index difference of the two faces, thereby expressing different functions.

Figure 11A:
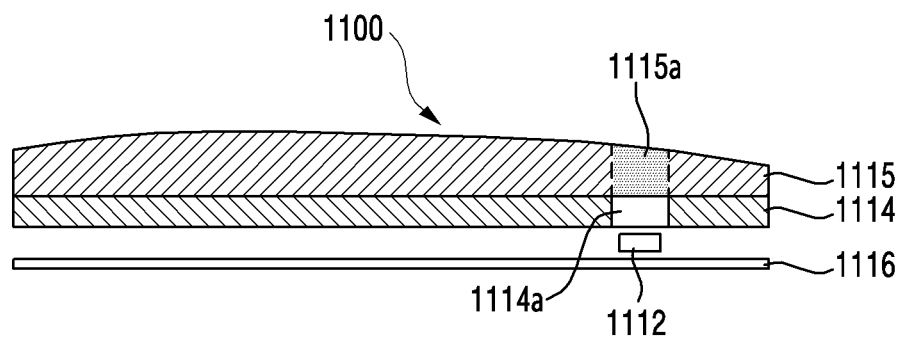
FIG. 11A and FIG. 11B are cross-sectional views illustrating respective structures of optical sensors according to certain embodiments of the present disclosure.
Figure 11B:
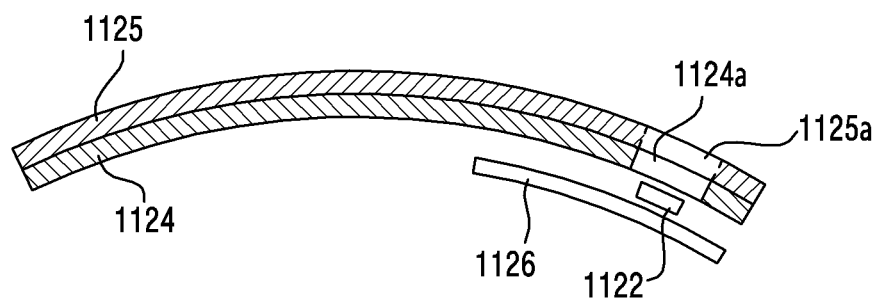

FIG. 11A and FIG. 11B are cross-sectional views illustrating respective structures of optical sensors according to certain embodiments of the present disclosure.

Referring to FIG. 11A, an electronic device 1100 according to certain embodiments may be implemented identically to the electronic device 100 of FIG. 1A to FIG. 1C. The electronic device 1100 according to certain embodiments may include a flexible display 1114 and a window 1115 which is implemented to have a non-uniform thickness and which is joined to the flexible display 1114. The window 1115 may include a surface implemented of a 3-dimensionally curved face.

The electronic device 1100 according to certain embodiments may have an optical sensor 1112 disposed below the flexible display 1114, that is, in a second direction of the flexible display 1114. In addition, to enable an optical operation of the optical sensor 1112, an opening 1114*a* may be implemented by removing part of the flexible display 1114 corresponding to the optical sensor 1112, or may be implemented of a transparent material after removing the part thereof.

The optical sensor 1112 may perform the optical operation due to the opening 1114*a* of the flexible display. The window 1115 may be implemented of a transparent material, so that an optical signal output from the optical sensor 1112 is emitted to the outside via the opening 1114*a* and a portion 1115*a* of the window and thereafter is received again in the optical sensor 1112. For example, the optical sensor 1112 as a sensor capable of performing an optical operation may include an image sensor, a proximity sensor, a fingerprint sensor, or the like. The opening 1114*a* and the portion 1115*a* of the window may serve as a waveguide of the optical signal of the optical sensor 1112.

The optical sensor 1112 according to certain embodiments may generate an electrical signal or data value corresponding to an internal operating state of the electronic device 1100 or an external environmental state. The optical sensor 1112 may be, for example, at least one sensor (not shown) disposed to a first face 110A of the body 110 (e.g., the housing).

The electronic device 1100 according to certain embodiments may include sensors (not shown), for example, at least one of a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, and an illuminance sensor.

In the window 1115 according to certain embodiments, an outer face facing a first direction may be implemented of a three-dimensional curved face. Since an optical signal may be distorted while the optical signal passes through one portion 1115*a* of the window, a refractive index may be adjusted to compensate for the distortion of the optical signal. A film or the like capable of compensating for the refractive index may be added to a lower portion of the portion 1115*a* of the window or inside the opening 1114*a*. A printed circuit board may be indicated by a reference numeral 1116.

Referring to FIG. 11B, an electronic device 1120 according to certain embodiments may be implemented identically to the electronic device 100 of FIG. 1A to FIG. 1C. The electronic device 1120 according to certain embodiments may include a flexible display 1124 and a window 1125 which has a uniform thickness and which is joined to the flexible display 1124.

The electronic device 1120 according to certain embodiments may have an optical sensor 1122 disposed below the flexible display 1124, that is, in a second direction of the flexible display 1124. In addition, to enable an optical operation of the optical sensor 1122, an opening 1124*a* may be implemented by removing part of the flexible display 1124 corresponding to the optical sensor 1122, or may be implemented of a transparent material after removing the part thereof. The optical sensor 1122 may perform the optical operation due to the opening 1124*a* of the flexible display. The window 1125 may be implemented of a transparent material, so that an optical signal output from the optical sensor 1122 is emitted to the outside via the opening 1124*a* and a portion 1125*a* of the window and thereafter is received again in the optical sensor 1122. For example, the optical sensor 1122 as a sensor capable of performing an optical operation may include an image sensor, a proximity sensor, a fingerprint sensor, or the like. In the window 1125 according to certain embodiments, an outer face facing a first direction may be implemented of a three-dimensional curved face. A printed circuit board may be indicated by a reference numeral 1126.

Figure 12A:
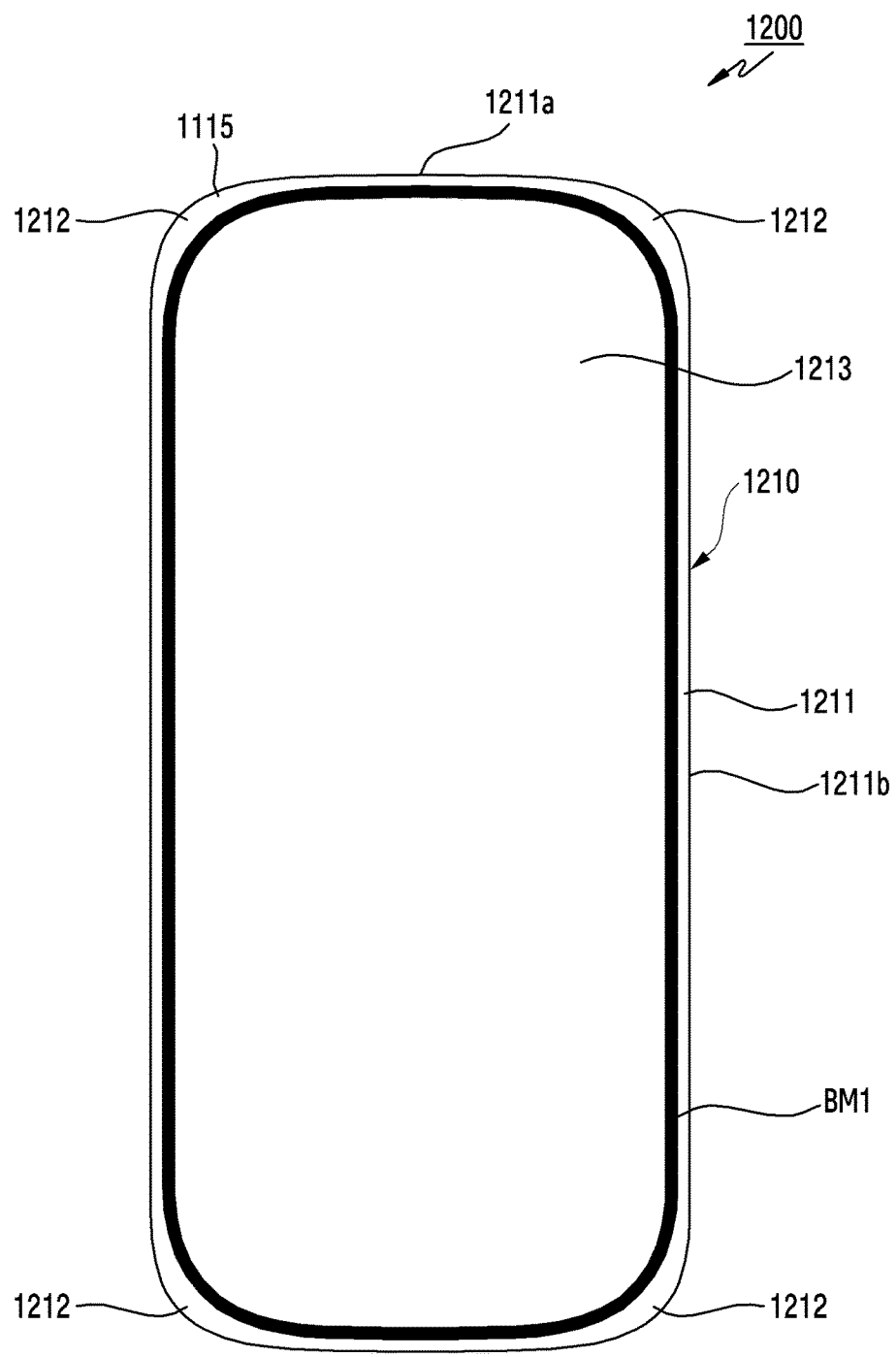
FIG. 12A is a plan view illustrating an electronic device according to certain embodiments of the present disclosure.
Figure 12B:
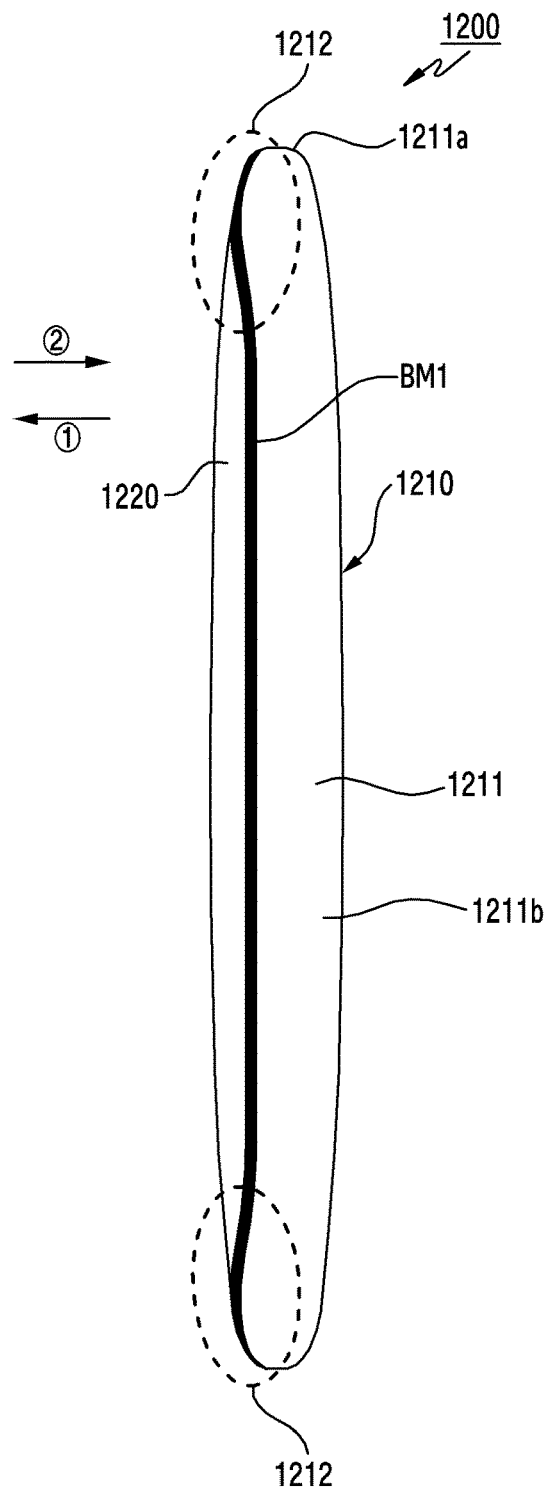
FIG. 12B is one lateral view.
Figure 12C:
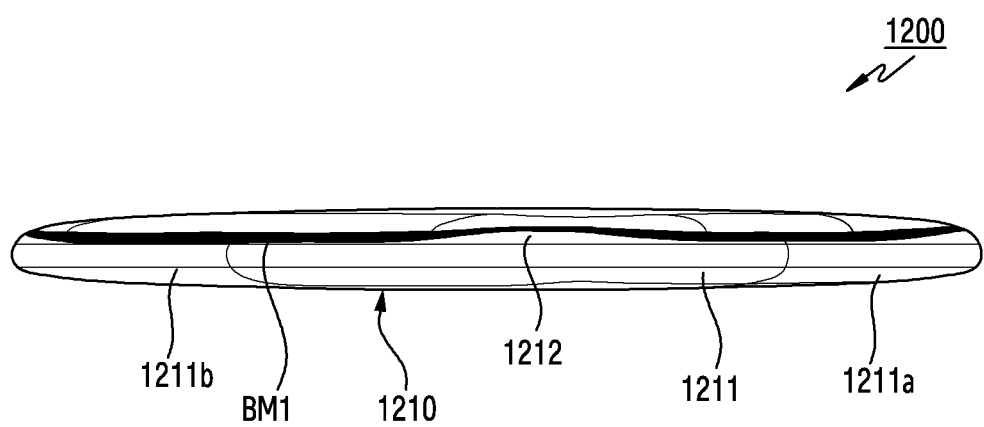
FIG. 12C is the other lateral view.

FIG. 12A is a plan view illustrating an electronic device according to certain embodiments of the present disclosure, FIG. 12B is one lateral view, and FIG. 12C is the other lateral view.

Referring to FIG. 12A to FIG. 12C, in an electronic device 1200 according to certain embodiments, if the flexible display 600 of FIG. 6 is employed, four corner portions 1212 of a housing 1211 including an external appearance of a body 1210 may be viewed to be relatively wide. The electronic device 1200 according to certain embodiments may be implemented in a shape in which the housing 1211 is gradually raised while surrounding window glass in a (+)Z-axis direction.

The electronic device 1200 according to certain embodiments may have a BM line BM1 located at an edge of the window. The BM line BM1 may be a black printed face of a window rear face which exists in a non-visible area of the window.

The BM line BM1 may extend in parallel from a lateral face of the housing 1211, may be gradually raised in a first direction at the corner portion 1212 and then be gradually lowered in a second direction, and then may extend again in parallel from a lateral face 1211*b* of the housing. A reference numeral 1211*a* may refer to an upper end of the housing. A reference numeral 1213 may be a visible area which is viewed from a front face of the body.

Referring to FIG. 12C, when the electronic device 1200 according to certain embodiments is viewed in a lateral direction, data displayed on two lateral faces may be visible.

Figure 13A:
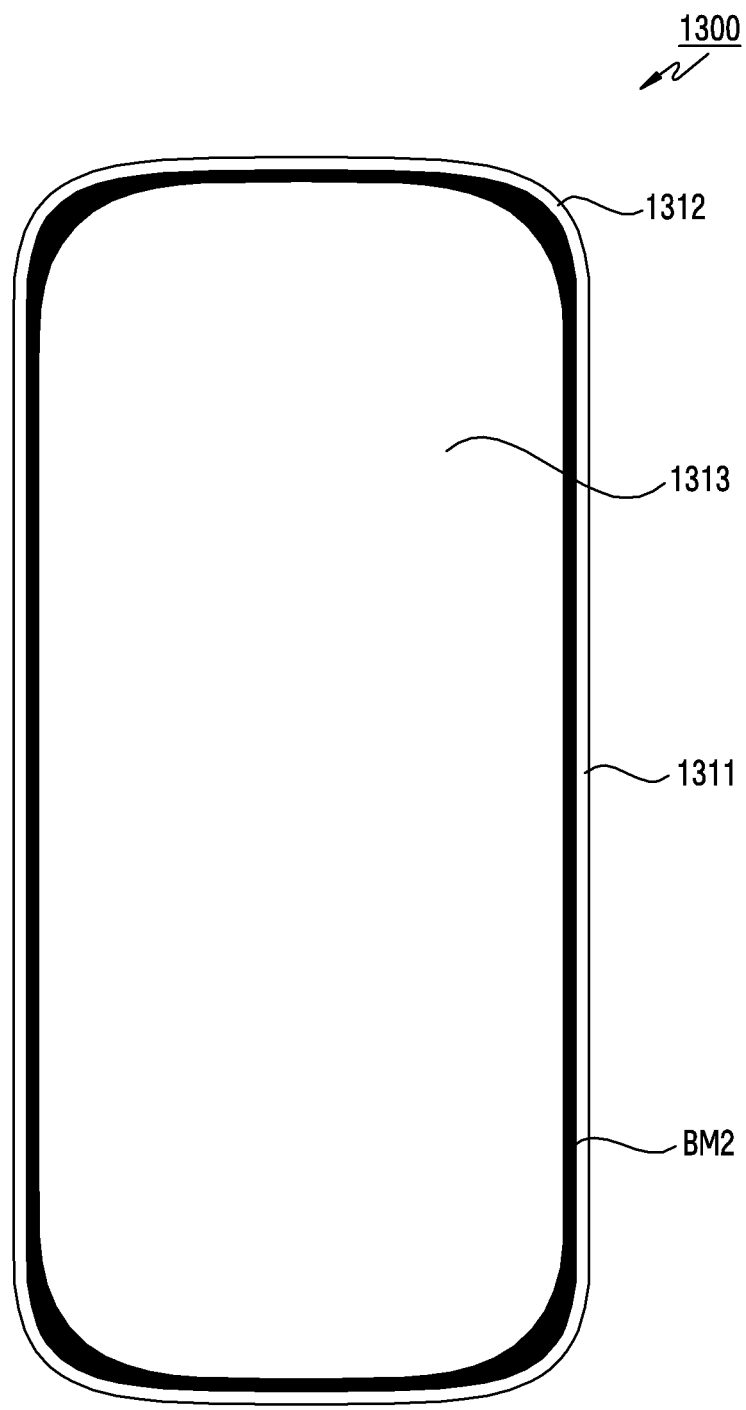
FIG. 13A is a plan view illustrating an electronic device according to certain embodiments of the present disclosure.
Figure 13B:
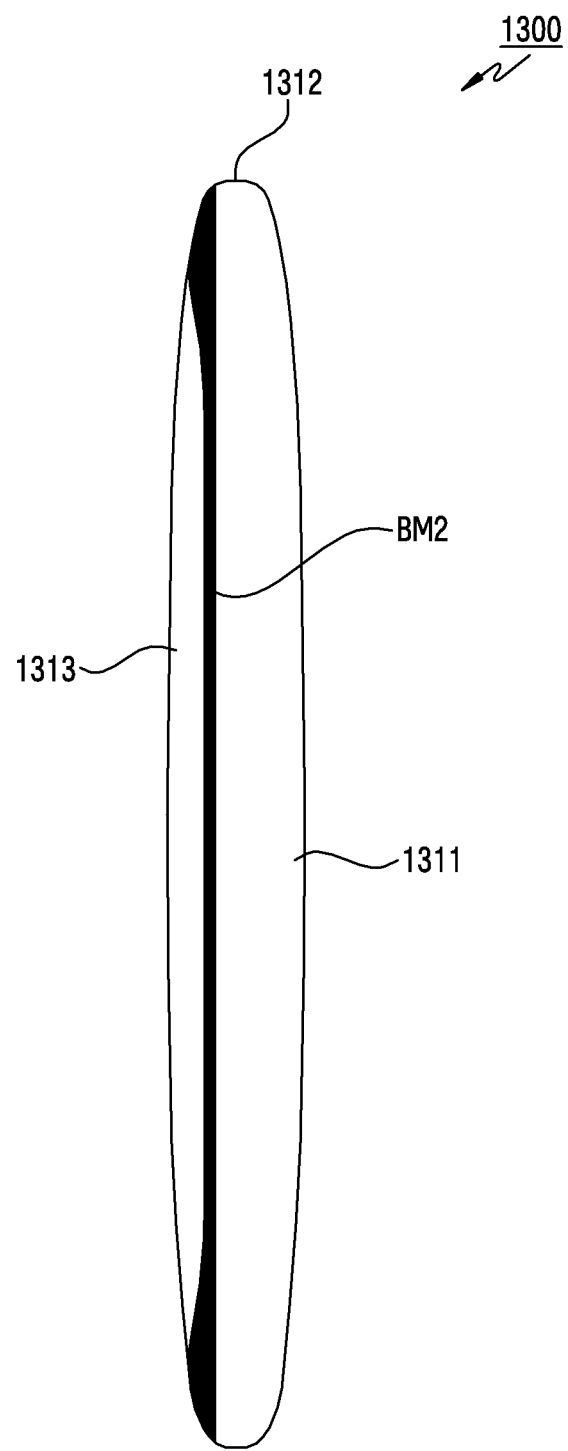
FIG. 13B is a lateral view.

FIG. 13A is a plan view illustrating an electronic device according to certain embodiments of the present disclosure, and FIG. 13B is a lateral view.

Referring to FIG. 13A and FIG. 13B, an electronic device 1300 according to certain embodiments may have a BM line BM2 located at an edge of a window. The BM line BM2 may be a black printed face of a window rear face which is disposed in a non-visible area of the window. The BM line BM2 may be implemented to have a width which is slightly wider near the edge of the body 1311.

The BM line BM2 may extend substantially in parallel along a lateral face of the housing 1312. A reference numeral 1313 may refer to a visible area which is viewed from a front face of the body 1311.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally implemented component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

At least a part of an apparatus (e.g., modules or functions thereof) or method (e.g., operations) according to the present disclosure may be, for example, implemented as instructions stored in a computer-readable storage medium in a form of a programming module. In case that the instruction is executed by a processor (e.g., processor 120), and the processor may perform functions corresponding to the instructions. The computer-readable storage media may be the memory 130, for instance.

The computer-readable recording medium may include a hard disk, a floppy disk, and a magnetic medium (e.g., a magnetic tape), an optical medium (e.g., a Compact Disc-Read Only Memory (CD-ROM) and a Digital Versatile Disc (DVD)), a Magneto-Optical Medium (e.g., a floptical disk), and a hardware device (e.g., a Read Only Memory (ROM), a Random Access Memory (RAM), a flash memory, etc.). Also, the program instruction may include not only a mechanical language code such as a code made by a compiler but also a high-level language code executable by a computer using an interpreter, etc. The aforementioned hardware device may be implemented to operate as one or more software modules in order to perform operations of the present disclosure, and vice versa.

The module or programming module according to the present disclosure may include at least one or more of the aforementioned elements, or omit some of the aforementioned elements, or further include additional other elements. Operations carried out by the module, the programming module or the other elements according to the present disclosure may be executed in a sequential, parallel, repeated or heuristic method. Also, some operations may be executed in different order or may be omitted, or other operations may be added.

Meanwhile, the example embodiments disclosed in the specification and drawings are merely presented to easily describe the technical contents of the present disclosure and help with the understanding of the present disclosure and are not intended to limit the present disclosure. Therefore, all changes or modifications derived from the technical idea of the present disclosure as well as the embodiments described herein should be interpreted to belong to the present disclosure.

What is claimed is:

1. An electronic device, comprising:
a body including a first face oriented in a first direction having a curvature, a second face oriented towards a second direction opposite to the first direction, and a first, second, third, and fourth corner; and
a display module including a flexible display disposed under a window on the first face, the flexible display including a central visible area formed in a substantially rectangular shape,
the flexible display including first, second, third and fourth visible areas disposed adjacent to four respective edges of the central visible area, wherein the first, second, third, and fourth corners of the body are visible between the first, second, third, and fourth visible areas of the display module;
wherein the first, second, third and fourth visible areas each respectively include first, second, third and fourth visible lateral areas extending from a terminal edge of each of the first, second, third and fourth visible areas, and
first, second, third and fourth non-visible corner areas each of which coupling two visible lateral areas adjacent to one another, and
wherein at least one of the first, second, third and fourth non-visible corner areas has at least one hole compensating for an elongation difference.

2. The electronic device of claim 1, wherein when the first face is viewed vertically from above,
the first visible area is disposed at an upper end side of the central visible area,
the second visible area is disposed at a lower end side of the central visible area,
the third visible area is disposed at a left lateral side of the central visible area, and
the fourth visible area is disposed at a right lateral side of the central visible area.

3. The electronic device of claim 1, wherein the central visible area includes a display area which is visible when the body is viewed from the first face, and each of the first, second, third and fourth visible areas are visible when the body is viewed from the first face and a lateral face.

4. The electronic device of claim 1, wherein a joining face between the flexible display and the window includes one of a flat plane and a curvature.

5. The electronic device of claim 1, wherein each of the first, second, third and fourth visible areas a uniform width, wherein the first, second, third and fourth corners of the body have a uniform width.

6. The electronic device of claim 5, wherein the first, second, third and fourth visible areas include the uniform width, which the uniform width being a same width as the first, second, third and fourth corners.

7. The electronic device of claim 1, wherein a width of the first, second, third, and fourth corners of the body are non-uniform, and a largest width among widths of the first, second, third, and fourth corners of the body are greater than widths of each of the first, second, third and fourth visible areas.

8. The electronic device of claim 1, wherein the first face is curved as to extend from a center to each corner portion of the body and to each lateral face.

9. An electronic device, comprising:
a first face oriented in a first direction, the first face formed having a curvature and disposed as to be visible from an exterior of the electronic device;
a body including a second face oriented towards a second direction opposite to the first direction, the second face visible from the exterior;
a display module visible when viewing the first face, the display module including a flexible display disposed under a window, and the flexible display including a central visible area formed in a substantially rectangular shape including first, second, third and fourth visible areas disposed adjacent to four respective edges of the central visible area; and
first, second, third and fourth non-visible corner areas each of which coupling two visible lateral areas adjacent to one another,
wherein the first, second, third and fourth visible areas each respectively include first, second, third and fourth visible lateral areas extending from a terminal edge of each of the first, second, third and fourth visible areas, and
wherein the first, second, third and fourth visible areas are disposed separately from each other.

10. The electronic device of claim 9, wherein the first, second, third and fourth visible lateral areas are coupled integrally by means of the first, second, third and fourth non-visible corner areas.

11. The electronic device of claim 9, wherein the first, second, third and fourth visible lateral areas have the same width.

12. The electronic device of claim 9, wherein at least one of the first, second, third and fourth non-visible corner areas has at least one hole compensating for an elongation difference.

13. An electronic device comprising:
a window formed in a front face of the electronic device; and
a housing formed in a rear face of the electronic device, the housing at least partially circumferentially surrounding a periphery of the window,
wherein a flexible display of the electronic device is visible through the window, the flexible display including:
a central visible area disposed at a center portion of the flexible display, and having a first curvature, and
first, second, third and fourth visible areas extending towards the housing, the first, second, third and fourth visible areas having a second curvature,
wherein the first, second, third and fourth visible areas respectively include first, second, third and fourth visible lateral areas extending from terminal edges of each of the first, second, third and fourth visible areas,
first, second, third and fourth non-visible corner areas each of which coupling two visible lateral areas adjacent to one another, and
wherein at least one of the first, second, third and fourth non-visible corner areas has at least one hole compensating for an elongation difference.

14. The electronic device of claim 13, wherein the first, second, third and fourth visible lateral areas disposed separately from one another at respective corners of the central visible area.

15. The electronic device of claim 13, wherein the first, second, third and fourth visible lateral areas integrally coupled with one another.

16. The electronic device of claim 14, wherein the first, second, third and fourth visible lateral areas have a third curvature, and are at least partially utilized as a display area.

17. The electronic device of claim 13, wherein the front curved as to extend from a center to each corner portion of the housing and to each lateral face.

18. The electronic device of claim 13, further comprising a Black Matrix Line disposed at an edge of the window and surrounding the window.

* * * * *